United States Patent [19]

Becker

[11] Patent Number: 4,490,257
[45] Date of Patent: Dec. 25, 1984

[54] PROCESS FOR PURIFICATION OF WASTE WATERS ACCUMULATED FROM PULP PRODUCTION, PARTICULARLY FROM CHLORINE BLEACHING OF PULP

[76] Inventor: Dieter J. Becker, Hohenloher Ring 30, 2087 Bonningstedt, Fed. Rep. of Germany

[21] Appl. No.: 582,487

[22] Filed: Feb. 22, 1984

[30] Foreign Application Priority Data

Feb. 25, 1983 [AT] Austria .................................. 671/83

[51] Int. Cl.$^3$ .............................................. C02F 1/46
[52] U.S. Cl. .................... 210/610; 210/631; 210/718; 210/725; 210/748; 210/928; 162/29; 204/149
[58] Field of Search ............... 210/610, 631, 718, 721, 210/725, 735, 448, 928; 162/29, 30 R, 41, 43, 50; 204/149, 152, 302, 303

[56] References Cited

U.S. PATENT DOCUMENTS

| | | | |
|---|---|---|---|
| 3,178,260 | 4/1965 | Tirado | 210/928 X |
| 3,737,374 | 6/1973 | Stern et al. | 210/611 X |
| 3,894,946 | 7/1975 | Panzer et al. | 210/928 X |
| 4,098,673 | 7/1978 | Zucker | 204/149 X |
| 4,259,149 | 3/1981 | Taszka et al. | 162/29 |

*Primary Examiner*—Thomas Wyse
*Attorney, Agent, or Firm*—Roylance, Abrams, Berdo & Goodman

[57] ABSTRACT

There is disclosed a process for purification of waste waters accumulating from the production of pulp, particularly from chlorine bleaching of pulp, which comprises the combination of the following steps:

(a) release of solid particles from the waste water in a series-connected, mechanical purification stage, (b) introduction of the pre-cleaned waste water into an electrolysis installation, wherein the waste water is subjected to constant movement during an anodic oxidation treatment, and an electric potential differential is plotted between the electrodes and the pH of the waste water is set and maintained at approximately 1 to 6.5 in a known manner, (c) transfer of the waste water thus treated from stage (b) into a flocculation (sedimentation) zone, in which an aqueous solution of a powerful cationic polyelectrolyte is fed to the waste water at room temperature and under constant movement, and the pH is set and maintained at 1 to 6.5, and flocculation of colloids and suspended components occurs, (d) transfer of the waste water thus treated together with the flocculated products from stage (c) into another zone, in which the flocculated products are separated out, (e) neutralization of the waste water which is freed of the flocculated products, and (f) transfer of the neutralized waste water into an activated sludge installation, in which, with addition of additive nutrient materials, suitable microorganisms cause biological decomposition of the organic products still present in the waste water, whereupon the waste water which is thus clarified is discharged into a receiving stream.

9 Claims, No Drawings

PROCESS FOR PURIFICATION OF WASTE WATERS ACCUMULATED FROM PULP PRODUCTION, PARTICULARLY FROM CHLORINE BLEACHING OF PULP

BACKGROUND OF THE INVENTION

The invention relates to a process for the purification of waste waters accumulating from pulp production, particularly from chlorine bleaching of pulp.

It is known that great volumes of water are used in pulp production. As a result of this, large volumes of waste water also accumulate in the course of the processing, which cannot be discharged into the environment without being purified, because they contain various solid, colloidal or dissolved products. Because they contain numerous environmental pollutant materials, the legal provisions relative to waste water purification have recently become more severe, and adherence to these rules introduces new, difficult, technical and economical problems, particularly to the pulp, paper and cardboard manufacturer.

The waste water accumulating from pulp and paper production contains large quantities of organic products dissolved from the raw wood product, particularly lignin and hemicelluloses, which are present for the most part as colloidal or true solutions in the waste water. One particular problem is produced by waste waters coming from the pulp bleaching unit, because they contain a considerable quantity of chemicals used in bleaching or their reaction products, which, on account of their toxicity, have an extraordinary environment polluting effect. The content of substances with mutagenous properties in the waste waters of pulp chlorination is particularly critical, as has been established by L. Stockman, L. Stromberg, F. DeSousa, Cellulose Chem. Technol. 14 (1980), pages 517 to 526. According to this, compositions such as 1,3-dichloroacetone, monochloroacetaldehyde, trichloroethylene, 2-(3-)-chloropropanol, chloroform and carbon tetrachloride, which are found in such waste waters, act as active mutagenous substances. For example, 1 to 5 mg/l of chloroform was found in a sample of waste water, which corresponds to a quantity of 40 to 200 g of chloroform per ton of pulp. Although some of these compositions are relatively unstable, there are still others which remain relatively stable over a long period of time under normal conditions. A rapid and effective method of making these compositions ineffective within the framework of the purification of such waste water would thus be very desirable.

The processes used up to the present time for purification or elimination of the large volumes of waste water accumulating from pulp production and particularly from the chlorine bleaching of the pulp are mostly rather time-consuming and costly and still do not provide the desired satisfactory results in terms of waste waters which pollute the environment as little as possible.

In the past, the waste water accumulating from pulp production and chlorine bleaching of pulp were frequently boiled down and the residues subsequently burned. Disregarding the high energy cost accruing with the boiling-down, large amounts of halogen are released from the bleaching waste waters with burning of the residues, which leads to extensive pollution of the environment, and therefore is very unsatisfactory.

Other solutions of the waste water problems which arise have been suggested, e.g. superfiltration or adsorption methods. However, it has been shown that these known methods are generally not suitable for continuous purification to the required degree of the waste water charged with a large load of dirt, so that it can without hesitation be fed back into the water system. It has particularly been shown that the waste waters which are so pre-treated cannot be fed into a biological purification, since they still contain chemicals from the bleaching which damage the microorganisms in a biologically activated sludge installation, and thus would greatly impair the process. That is why such processes have not been used extensively in the pulp, paper and cardboard industries.

BRIEF DESCRIPTION OF THE INVENTION

The present invention is a process for purification of waste waters accumulating from pulp, paper and cardboard industries, and also waste waters from pulp bleaching units, in which the aforementioned drawbacks are entirely or for the most part overcome, wherein, particularly in reference to environmental pollution, particularly problematical components and chemicals are made harmless in a technically and economically satisfactory manner, and the waste water can be subjected to a final purification stage of biological purification, without the danger of damage to the microorganisms being used for it, or danger that the activated sludge installation will become notably impaired or entirely destroyed in the process.

In accordance with the invention, there is provided a process for purification of waste waters accumulating from the production of pulp, particularly from chlorine bleaching of pulp, which comprises the combination of the following steps:

(a) release of solid particles from the waste water in a series-connected, mechanical purification stage, (b) introduction of the pre-cleaned waste water into an electrolysis installation, wherein the waste water is subjected to constant movement during an anodic oxidation treatment, and an electric potential differential is plotted between the electrodes and the pH of the waste water is set and maintained at approximately 1 to 6.5 in a known manner, (c) transfer of the waste water thus treated from stage (b) into a flocculation (sedimentation) zone, in which an aqueous solution of a powerful cationic polyelectrolyte is fed to the waste water at room temperature and under constant movement, and the pH is set and maintained at 1 to 6.5, and flocculation of colloids and suspended components occurs, (d) transfer of the waste water thus treated together with the flocculated products from stage (c) into another zone, in which the flocculated products are separated out, (e) neutralization of the waste water which is freed of the flocculated products, and (f) transfer of the neutralized waste water into an activated sludge installation, in which, with addition of additive nutrient materials, suitable microorganisms cause biological decomposition of the organic products still present in the waste water, whereupon the waste water which is thus clarified is discharged into a receiving stream.

With this combination of consecutive steps according to the invention, waste water from pulp, paper and cardboard production can be purified under economically satisfactory conditions, which until this time have been problematical, and particularly problematical in reference to environmental pollution, so that by the execution of the combination of stages of the process according to the invention, a waste water is obtained which can be discharged without hesitation into the general water systems and through receiving streams into rivers and seas.

DETAILED DESCRIPTION OF THE INVENTION

In addition to the dissolved products and suspended fine particles, the waste water accumulating from pulp production and/or the waste water from the chlorine bleaching of pulp materials generally also contains coarse solid particles, which are separated in a mechanical pre-cleaning stage, mostly in the form of one or more settling tanks. The waste water can be alkaline or acidic, depending upon the part of the pulp production from which it originates. These waste water streams are generally combined, and generally the volume of acidic waste water exceeds that of alkaline waste water, so that the purified waste water stream generally has a pH in the range of 2 to 5. In any case, the purified waste waters are set at a pH of from 1 to 6.5, before, during or following the mechanical pre-cleaning, as necessary.

The waste water which is freed of coarse solid particles is generally at a temperature of about 20° to 40° C., and is fed into an electrolysis installation in which it is subjected to anodic oxidation under constant movement, e.g. by suitable stirring devices. The electrolysis installation generally consists of a series of plate electrodes of a material which is very corrosion-resistant to halogens and halides, especially to chlorine and chlorides. Such materials are known to the person in the art. Plate electrodes of austenitic stainless steel (AVESTA 254 SMO) and of titanium or titanium alloys (e.g. ATi 24 Pd), as well as carbon, have been particularly successful. These electrodes could be connected in series or parallel.

The plate electrode pairs are offset from each other, to guarantee as good as possible contact of the waste water with the electrode plates preferably in an electrolysis container, so that the waste water is forced to change its flow direction, upon engagement with a pair of electrodes. The number of pairs of electrodes in a series depends upon the quantity and pollution level of the waste water which flows through the electrolysis installation in one time unit.

While the waste water flows through the electrolysis installation, a suitable electric potential differential is plotted between the electrodes. It is generally from a direct current source of 3 to 24 V and 15 to 50 A at a waste water temperature of 10° to 40° C. The pH of the waste water shall be in the range of 1 to 6.5, preferably from 1.5 to 4, and can be set and maintained in a known manner at a pH in this range.

While the waste water is being fed continuously through the electrolysis installation and thus past the individual pairs of electrodes, oxidation of the organic components is taking place at the anode along with simultaneous release of the chlorine from the chlorinated organic compositions. In this process, the mutagenous compositions from the bleaching liquors are inactivated by oxidation, and biotoxic substances which are present are split by oxidation. Thus, substances which have long prevented less costly biological purification because of their destruction of the microorganisms are made harmless by the electrolysis treatment under the given conditions. The released chlorine returns to the bleaching process, and the process is still economical.

The dimensions of the electrolysis installation and the flow velocity of the waste water to be treated are selected so that the average duration of the continuous waste water flow through the electrolysis installation is about 15 minutes to 1 hour, preferably 20 to 40 minutes. The anodic oxidation being carried out during this time suffices to oxidize or to split most of the biotoxic and mutagenous material, particularly that from the bleaching waste water, into harmless substances, so that they can not longer impair or prevent the biological purification of the waste water which occurs in a later stage.

Following the electrolysis, the waste water is carried over into a flocculation zone, wherein it is moved constantly by suitable stirring devices, at room temperature, with a powerful cationic polyelectrolyte. Suitable polyelectrolytes include e.g. polyethylene imine, e.g. SEDIPUR (CL 930), available commercially. The polyelectrolyte is present in a 0.05% to 1% by weight aqueous solution, preferably in a 0.1 to 0.2% by weight aqueous solution, and the pH of the waste water should be from 1 to 6.5, preferably from 1.5 to 4. The desired flocculation of colloids and suspended components occurs with mixing of the polyelectrolyte with the waste water, and macroflocculated aggregates are better separated from the original microflocculated aggregates with intermittent strong stirring.

The flocculated products are separated in another zone, and any suitable means can be used for the separation. An industrial scale filtration installation is used in the simplest case, but the separation preferably occurs by flotation or sedimentation, or by use of centrifugal force. The devices and measures required for this are known to the person in the art and therefore need no further explanation.

The waste water freed of the flocculated products is then neutralized; sodium hydroxide solution or lime is added in the required proportion as a neutralizer. Following intermediate filtration, the neutralized waste water can be transferred into a biologically activated sludge installation, wherein the organic products still present in the waste water are for the most part biologically decomposed by microorganisms, and nutritive additives (e.g. nitrogen- and phosphorous-containing compositions) are generally added to the waste water, to favorably influence the growth and effectiveness of the microorganisms. The conditions for biological waste water purification in an activated sludge installation are known to the person in the art and therefore need not be more closely described.

Following adequate biological decomposition, the purification of the waste water is terminated in the activated sludge installation. The clarified waste water is then in such a purified state that it can without hesitation be passed through a receiving stream of the water discharge system and from there to the general water system. The average duration in the activated sludge installation is generally 24 hours.

. The invention is further illustrated by the following example.

EXAMPLE

Raw waste water from the chlorination stage of a sulfite cellulose bleaching unit with a pH of 1.8, a temperature of 28° C., a CSB level of 4200 mg $O_2$/l and a chloride content of 2000 mg/l was first of all freed of large solid particles in a settling tank. The raw waste water which was thus pre-cleaned was then introduced to an oblong 10-liter basin, with a stirring device, and an electrolysis installation with 5 pairs of electrodes. These were arranged alternately offset on the left and the right. A potential differential was plotted on the pairs of electrodes using a direct current source of about 15 V and 45 A. Plate electrodes of titanium (ATi 25 Pd) with a maximum content of 0.05% iron, 0.10% oxygen, 0.03% nitrogen, 0.05% carbon and 0.012% hydrogen were used as electrodes. The waste water to be treated flowed continuously and with constant stirring at a certain velocity through the electrolysis installation, for an average duration of 35 minutes.

The waste water following the electrolysis had a CSB level of only 1700 mg $O_2/l$ and a clearly lower chloride content of 1200 mg/l.

The waste water was introduced into another kettle at a temperature of about 20° C. and a pH of 2.5, wherein there was added with constant stirring a 0.2% aqueous polyethylene imine solution (molecular weight 1 to 2 million) which is a powerful cationic polyelectrolyte.

Colloids and suspended portions of the waste water were flocculated with the mixing.

The flocculated products were separated in a known manner by flotation and filtration. The filtered acidic waste water was neutralized with sodium hydroxide solution and subjected to a biological final purification in an activated sludge installation with addition of nitrogen and phosphate nutritive salts in a known manner. After 24 hours, the waste water was sufficiently clarified that it had a CSB level of only 400 mg $O_2/l$ and an unchanged chloride content of 1200 mg/l. It could then be introduced without hesitation into the receiving stream.

What is claimed is:

1. A process for the purification of waste waters accumulating from pulp production, particularly from chlorine bleaching of pulp, which comprises the combination of the following steps:
   (a) release of solid particles from the waste water in a series-connected, mechanical cleaning stage,
   (b) introduction of the cleaned waste water into an electrolysis installation, wherein the waste water is subjected to anodic oxidation under constant movement, and an electric potential differential is plotted between the electrodes, and the pH of the waste water is set and maintained in a suitable manner at about 1 to 6.5,
   (c) transfer of the waste water which is thus treated from stage (b) into a flocculation zone, in which an aqueous solution of a powerful cationic polyelectrolyte is added to the waste water under constant movement, and the pH is set and maintained at 1 to 6.5, and a flocculation of colloids and suspended components occurs,
   (d) transfer of the treated waste water together with the flocculated products from stage (c) into another zone, in which the flocculated products are separated out,
   (e) neutralization of the waste water freed of the flocculated products, and
   (f) transfer of the neutralized waste water into an activated sludge installation, for biological decomposition of the organic products still present in the waste water by suitable microorganisms, with addition of additive nutritive materials, whereupon the waste water which is so clarified is discharged into a receiving stream.

2. A process as defined in claim 1, wherein the anodic oxidation is carried out by plate electrodes of a material which is resistant to halogens and halides.

3. A process as defined in claim 2, wherein plate electrodes consisting of austenitic steel, titanium or titanium alloys are used.

4. A process as defined in claim 2, wherein plate electrodes consisting of carbon are used.

5. A process as defined in claim 1 wherein the anodic oxidation is carried out with a direct current source of about 3 to 24 V and 15 to 50 A.

6. A process as defined in claim 1 wherein the pH of the waste water during anodic oxidation is in the range of from 1.5 to 4.

7. A process as defined in claim 1 wherein a water-soluble polyethylene imine is used in the flocculation zone as the powerful cationic polyelectrolyte.

8. A process as defined in claim 7 wherein a 0.1 to 0.2% by weight aqueous polyethylene imine solution is used.

9. A process as defined in claim 1 wherein the chlorine which is released during the anodic oxidation is collected and carried back into the bleaching process.

* * * * *